United States Patent

Schoppee

[11] 4,056,199
[45] Nov. 1, 1977

[54] STACKER FOR GUM WRAPPING MACHINE
[75] Inventor: Lawrence W. Schoppee, Springfield, Mass.
[73] Assignee: Package Machinery Company, East Longmeadow, Mass.
[21] Appl. No.: 691,837
[22] Filed: June 1, 1976
[51] Int. Cl.² .............................................. B65G 57/30
[52] U.S. Cl. ................... 214/6 BA; 53/159; 214/6 S
[58] Field of Search ............... 214/6 BA, 6 S; 53/159, 53/387; 271/212

[56] References Cited

U.S. PATENT DOCUMENTS

| 2,276,744 | 3/1942 | Smith et al. ........................ 53/56 |
| 2,744,369 | 5/1956 | Seragnoli ...................... 214/6 BA X |
| 3,246,773 | 4/1966 | Hodgkins ........................ 214/6 BA |
| 3,805,971 | 4/1974 | Behrens et al. ................... 214/6 BA |

FOREIGN PATENT DOCUMENTS

1,079,522   4/1960   Germany ............... 214/6 S

*Primary Examiner*—L. J. Paperner
*Attorney, Agent, or Firm*—McCormick, Paulding & Huber

[57] ABSTRACT

Sticks of gum are fed individually to the bottom of a stack where each stick is raised by an elevator wheel to form the stack between side guides pivotally mounted, and biased toward one another. Each side guide has an abutment to keep the stack aligned vertically, and a presser foot resiliently holds the stack from above so that a pusher can move the stack out of the stacking station, into a wrapper, and thence into a tumble box for further handling.

7 Claims, 4 Drawing Figures

4,056,199

STACKER FOR GUM WRAPPING MACHINE

SUMMARY OF THE INVENTION

This invention relates generally to wrapping machines of the type particularly adapted to handle sticks of gum individually, and collectively in a stack for wrapping purposes. More particularly, this invention relates to a stacking station within such a machine for accumulating a predetermined number of sticks in a stack for purposes of applying an outer wrapper thereto. Machines for feeding sticks of gum either wrapped or unwrapped to a stacking station are well known in the art, and the reader is referred to the Smith et al U.S. Pat. No. 2,276,744 for a complete disclosure of one possible system for feeding sticks of gum individually to a stacking station. In more recent machines capable of higher speeds than that of the type disclosed in the Smith patent, the sticks of gum are individually fed into the stacking station by an indexing wheel, but it is a feature of the present invention that the stacking mechanism to be described is suitable for use with any of these types of stick infeed mechanisms.

Still with reference to the prior art generally, the Smith U.S. Pat. No. 2,276,744 also shows means for handling the stack of gum sticks whereby the stack is fed generally at right angles to a web of material and into one of several openings provided for this purpose in a tumble box or the like where the stack of gum sticks is further handled, usually being wrapped in the outer wrapper prior to being discharged from the machine.

The present invention relates to the mechanism for forming the stack of gum sticks fed individually to the stacking station so that they can be conveniently moved out of the stacking station in a downstream direction for further handling. More particularly, the present invention relates to means for elevating each stick fed to the stacking station, and said means may comprise a rotating stacker wheel with lobes suitable for indexing the sticks fed to recesses provided for this purpose in the wheel and for elevating each of these sticks in its turn at the stacking station. Side guides are provided at either end of the stack for guiding the ends of the sticks so elevated, and these side guides are mounted for limited lateral movement toward and away from one another in order to center the stack at the stacking station. Biasing means in the form of coiled compression springs are provided for urging these side guides inwardly toward one another to keep the stack oriented in centered relationship, and it is a further feature of the present invention that abutments are provided on the downstream edges of these side guides in order to further assist in supporting the stack as succeeding sticks are fed into the bottom of the stack at this stacking station.

Thus, the general aim of the present invention is to provide an improved stacking mechanism whereby the sticks of gum are positively handled throughout the stacking process, including that portion of the cycle when these stacked sticks of gum are pushed out of the stacking station into the web of outer wrapper material to be wrapped in a tumble box or the like.

DETAILED DESCRIPTION

Figure 1:
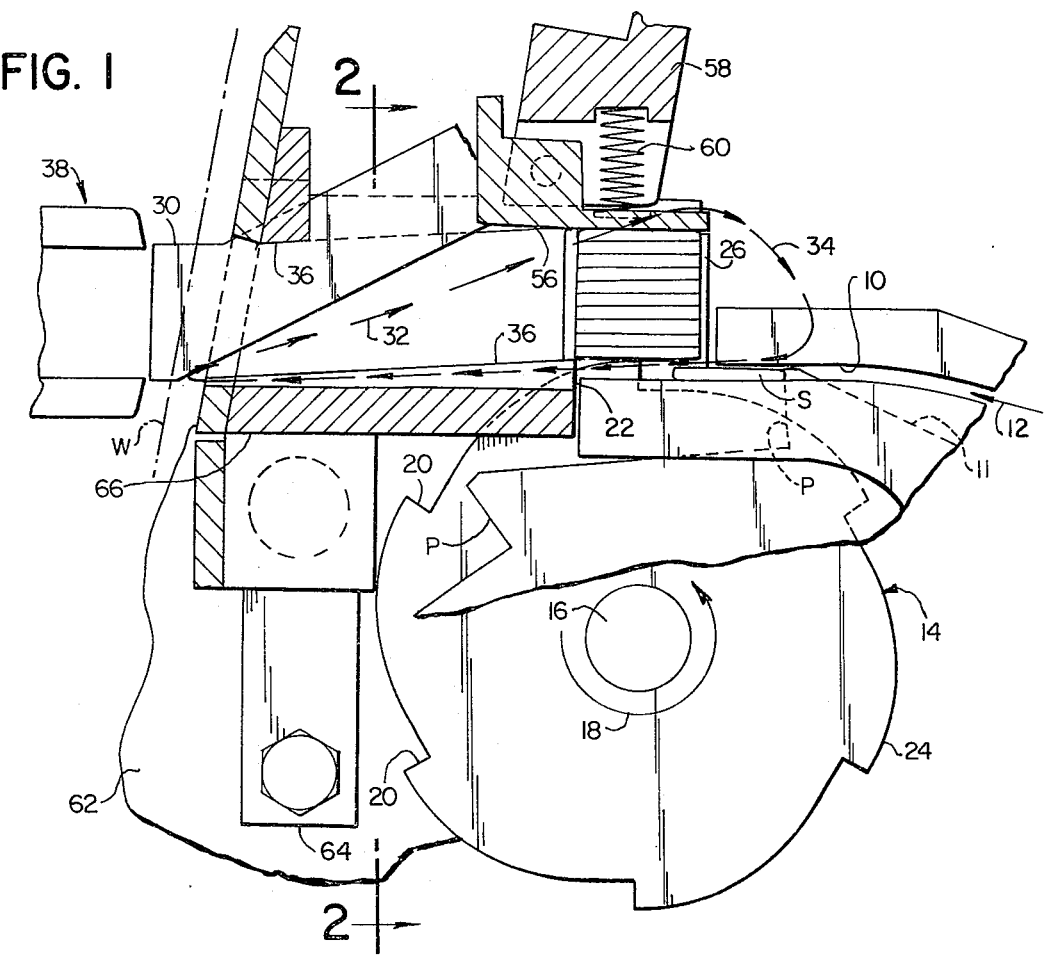
FIG. 1 is a vertical elevational and partial sectional view illustrating the stacking station with reference to the stick infeed mechanism for the sticks of gum, and also with reference to the tumble box in which the stack is wrapped, these latter portions of the drawings being illustrated in schematic fashion only to provide a frame of reference for the stacking mechanism to be described.

Turning now to the drawings in greater detail, FIG. 1 shows a series of gum sticks S, S fed by the pocket P of an index wheel 11 through a track defining structure 10 in the direction of the arrow 12 generally toward a stacking station to be described. While these gum sticks may be prewrapped, the actual process for wrapping these sticks and feeding them to the stacking station forms no part of the present invention and any conventional mechanism might be adapted for feeding these sticks S, S either by an index wheel as shown at 11, or by means of a walking beam of the type described in the above mentioned U.S. Pat. No. 2,276,744 to Smith et al, or by other means.

A stacker wheel 14 rotates on a fixed axis in the machine, and more particularly on the shaft 16 driven in the direction of the arrow 18 by suitable means (not shown) and preferably in timed relationship with the operation of other components of the machine, such as the index wheel 11, in a well known manner. As shown in FIG. 1 the foremost stick S in the stream of incoming gum sticks will move into one of the recesses defined by the stacker wheel 14 and be fed by the rotating index wheel 11 toward the surface 22 at the stacking station. When the stick S has reached the stacking station the lobe 24 on the stacker wheel 14 will cause that stick S to be raised upwardly between two side guides, one of which is shown at 26 in FIG. 1. The next stick of gum among those fed to the stacking station by the infeed or index wheel 11 will be received in the next pocket of the stacker wheel 14, with the result that it will be fed in under the first stick at the stacking station between the side guides 26 and 28, best shown in FIG. 2.

As a predetermined number of sticks are being stacked between the side guides 26 and 28 a stack pusher 30 will have travelled from the position shown in FIG. 1 generally rearwardly and upwardly in the direction of the arrow 32 and thence downwardly behind the stack, as suggested by the portion of the path indicated generally at 34 in FIG. 1, with the result that the pusher 30 is in position for moving the stack downstream. The side guides 26 and 28 remain at the stacking station and the stack is pushed toward the viewer in FIG. 2 through a passageway 36, defined for this purpose in the machine, to ultimately engage a web of wrapper material W such that the web and the stack of gum sticks can be received in a conventional tumble box structure as indicated generally at 38. The reader is referred to the above mentioned U.S. Pat. No. 2,276,744 issued to Smith et al for a more complete description of the portion of the machine downstream of the stacking station, that is for a more complete description of the pusher means 30 for moving the stack out of the stacking station and the associated mechanism for imparting the path of movement to the pusher as illustrated schematically in FIG. 1 by the path of the arrows 32, 34.

The tumble box structure and the means for timing the rotation of the tumble box with the rotation of the index wheel 11 is also described in detail in said U.S. Pat. No. 2,276,744.

Figure 2:
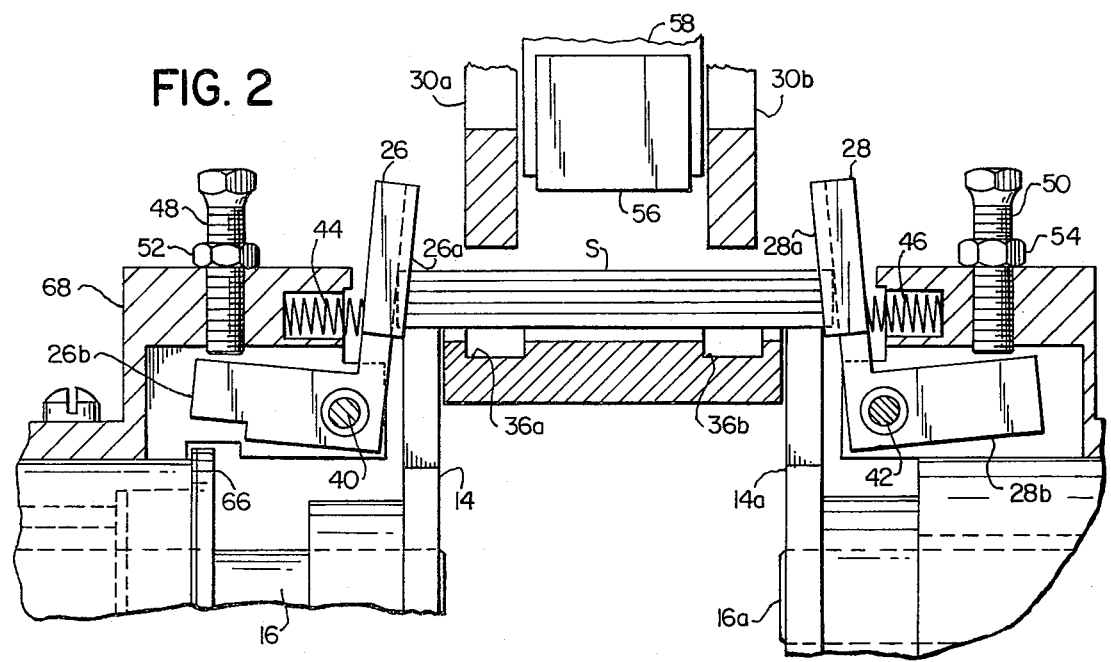
FIG. 2 is a vertical sectional view looking upstream being taken generally on the line 2—2 of FIG. 1, but through the side guide supporting structure at the stacking station.
Figure 3:
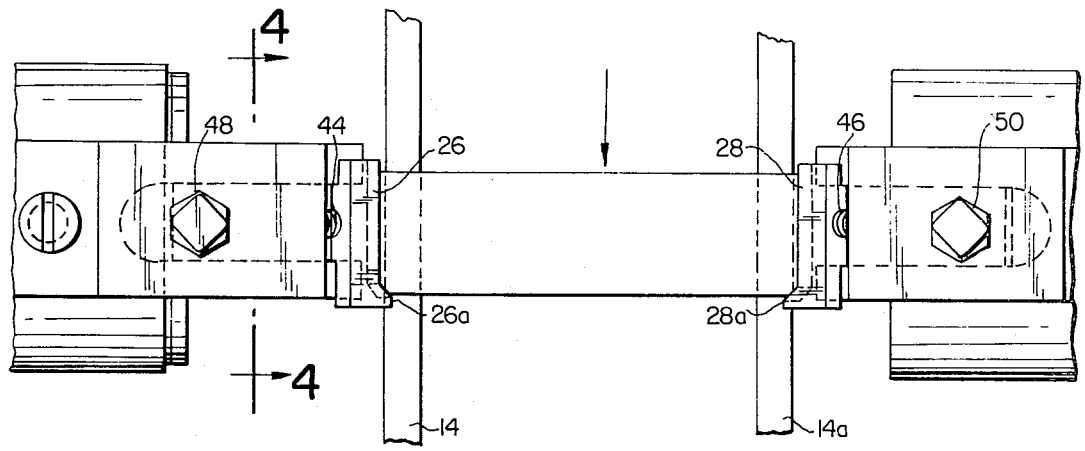
FIG. 3 is a plan view of the stacking mechanism illustrated in FIGS. 1 and 2.
Figure 4:
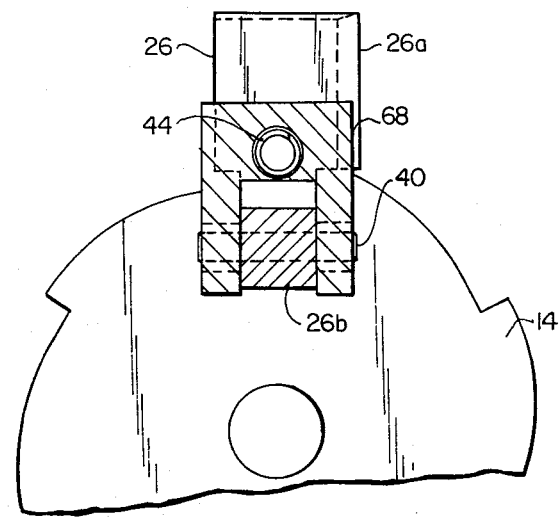
FIG. 4 is a sectional view taken generally on the line 4—4 of FIG. 3.

As described in the above mentioned patent, the pusher 30 is adapted to move downstream in the direction indicated schematically for it in FIG. 1, and the pusher itself more particularly comprises a pair of pusher members 30a and 30b which pusher members are adapted to move downwardly at the rearward limit of travel so as to be received in slots such as those indicated generally at 36a and 36b in FIG. 2. It is an important feature of the present invention that the pusher elements 30a and 30b must free the stack of sticks from the side guides, 26 and 28, and more particularly must supply sufficient force to cause the side guides to pivot away from one another so that the ends of the stack will be forced between the abutments 26a and 28a best shown in FIG. 3. The direction of movement of the stack in response to the above described motion of the pusher members 30a and 30b is illustrated generally by the arrow in FIG. 3, and although the pusher 30 itself is not illustrated in FIG. 3 it will be apparent that the pusher elements 30a and 30b will clear the stacker wheels 14 and 14a as best shown in FIG. 2.

Referring now more particularly to the construction of the side guides 26 and 28, and the means for supporting these side guides for limited movement toward and away from one another, FIG. 2 shows each of these side guides 26 and 28 as being supported for limited pivotal movement on an associated rock shaft 40 and 42 respectively. The location for these rock shafts is below the path of travel of the stack as it moves out of the stacking station, and these rock shafts are supported in fixed brackets 68 mounted to the machine frame 62 so as to permit the limited pivotal movement of the side guides 26 and 28 as described above. Each of these guides is biased inwardly toward the other by an associated spring, 44 and 46 respectively, said springs acting between the fixed brackets in the machine and the upwardly extending side guides as best shown in FIG. 2. Still with reference to the side guides 26 and 28, each of these can be seen from FIG. 2 to be of generally L-shape, the upwardly extending leg of the L defining the side guide portion, 26a and 28a respectively, thereof and the horizontally extending leg thereof defining an arm, 26b and 28b respectively, which can be engaged by a stop screw 48 and 50 respectively. The stop screws 48 and 50 can be preadjusted to limit the inner travel of the side guides, 26 and 28 respectively, until the first stick in the stack of gum sticks has reached the stacking station. Adjustable nuts, 52 and 54, are provided on these stop screws, 48 and 50 respectively, in order to lock the associated screws in the desired position for determining the inner limit of movement of the associated side guide 26 and 28 absent the gum sticks. As the gum sticks are accumulated at the stacking station, the stack moves up and the side guides move out slightly with the addition of each stick. The guides continue to keep end pressure on the sticks under the influence of the springs 44 and 46.

Means is provided above the stack of gum sticks being formed at the stacking station for urging the stack into a compacted condition prior to feeding of the stack through the passageway 36 described above. As best shown in FIG. 1, said means preferably comprises at least one presser foot 56 mounted in a structure 58, which structure is adapted for preadjustment to accommodate stacks of different height. The presser foot 56 is mounted, through a pin and slot connection, to the structure 58 and is spring biased downwardly as illustrated by the coiled compression spring 60 in FIG. 1. Thus, the presser foot 56 is adapted to urge the stack downwardly in order to hold it in a compressed condition at the stacking station, and thereby facilitate feeding of the stack in a downstream direction out of the stacking station through the passageway 36 and into an associated receptacle provided for this purpose in the rotating tumble box 38.

In accordance with conventional gum wrapping machine practice, the various components described above are mounted from a vertically extending plate or frame, such plate or frame being indicated generally at 62 in FIG. 1. As illustrated generally at 64, additional fixed frame structure is provided for mounting the passageway defining structure 66 in the path of movement of the stack as the stack is fed by the pusher 30 from the stacking station. The shaft 16 associated with each of the two stacker wheels 14 and 14a is split, having a portion 16a best shown in FIG. 2 associated with the right hand stacker wheel 14a. The fixed passageway defining structure 66 is also supported from the frame 62 and carries the bracket super-structure 68 for supporting the rock shaft 40 associated with the side guide 26. The other rock shaft 42 is similarly supported and the overall details of the supporting structure for the various components of a machine incorporating the present invention have been omitted herein for the purpose of clarifying the disclosure of the stacking mechanism to which the present invention is directed, as defined in the following claims.

I claim:

1. In an apparatus for receiving sticks of product fed individually to a stacking station and for moving the stack of sticks in a downstream direction out of the stacking station for further handling, the improvement comprising
   a. means for elevating each stick fed to the stacking station to allow the next stick to be fed into the bottom of a stack of sticks,
   b. side guides at the stacking station for guiding the sticks so elevated,
   c. mounting means for supporting said side guides for limited movement toward and away from the sides of the stack, and
   d. biasing means for urging the side guides inwardly toward one another to keep the stack oriented in centered vertical relationship therebetween,
   e. said side guides including abutments on their respective downstream edges for supporting and guiding the stack as succeeding sticks are fed into the bottom of the stack at the stacking station.

2. The combination defined in claim 1 further characterized by a presser foot at said stacking station for engaging the uppermost stick in the stack, and means biasing said presser foot downwardly to hold the stack in a compressed condition at said stacking station.

3. The apparatus set forth in claim 1 wherein the means for elevating each stick comprises at least one notched wheel having lobes between each notch to each stick reaching the stacking station during rotation of the wheel.

4. In an apparatus for receiving sticks of product fed individually to a stacking station and for moving the stack of sticks in a downstream direction out of the stacking station for further handling, the improvement comprising
   a. means for elevating each stick fed to the stacking station to allow the next stick to be fed into the bottom of a stack of sticks,
   b. side guides at the stacking station on for guiding the sticks so elevated,
   c. mounting means for supporting said side guides for limited movement toward and away from the sides of the stack, and
   d. biasing means for urging the side guides inwardly toward one another to keep the stack oriented in centered vertical relationship therebetween,
   e. said side guides pivotally mounted on shafts disposed below and parallel to the path of downstream movement of the stack.

5. The apparatus of claim 4 wherein said side guides include abutments on their respective downstream edges for supporting the stack as succeeding sticks are fed into the bottom of the stack at the stacking station.

6. The combination defined in claim 4 further characterized by stop means for limiting the inward motion of said side guides, each of said side guides having an L-shape with one of the legs of the L defining a stack engaging portion and the other leg defining an arm for engagement with said stop means.

7. The combination defined in claim 6 further characterized by a presser foot at said stacking station for engaging the uppermost stick in the stack, means biasing said presser foot downwardly to hold the stack in a compressed condition at said stacking station, and wherein said side guides have abutments on their downstream edge for support of the stack as sticks are added thereto.

* * * * *